(12) United States Patent
Watanabe

(10) Patent No.: US 6,211,981 B1
(45) Date of Patent: Apr. 3, 2001

(54) OPTICAL WAVELENGTH MULTIPLEX TRANSMISSION SYSTEM USING REPEATERS

(75) Inventor: Seiji Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/975,702

(22) Filed: Nov. 21, 1997

(30) Foreign Application Priority Data

Nov. 29, 1996 (JP) .................................................... 8-319586

(51) Int. Cl.[7] .................................................... H04J 14/02
(52) U.S. Cl. ........................... 359/133; 359/134; 359/124
(58) Field of Search ..................................... 359/124, 134, 359/174, 161, 187, 339

(56) References Cited

U.S. PATENT DOCUMENTS

| | | | |
|---|---|---|---|
| 5,225,922 | * 7/1993 | Chraplyvy et al. | 359/124 |
| 5,537,634 | * 7/1996 | Fye | 359/124 |
| 5,754,320 | * 5/1998 | Watanabe et al. | 359/117 |

FOREIGN PATENT DOCUMENTS

| | | |
|---|---|---|
| 0 543 570 A2 | 5/1993 | (EP) . |
| 0 695 049 A1 | 1/1996 | (EP) . |
| 0 715 191 A2 | 6/1996 | (EP) . |
| 59-127003 | 7/1984 | (JP) . |
| 59-127033 | 7/1984 | (JP) . |
| 2-10929 | 1/1990 | (JP) . |
| 5-327662 | 12/1993 | (JP) . |
| 8-223136 | 8/1996 | (JP) . |

OTHER PUBLICATIONS

Japanese Office Action, dated Feb. 9, 2000, with English language translation of Japanese Examiner's comments.
Fukutoku, M., Oda., K. & Toba, Hiromu, T., "Optimum Gain Equalization for WDM Multistage In–Line Amplifier System," *Electronic Information Communication Association Report*, vol. 95, No. 185, Jul. 26, 1995, pp. 13–19.
Japanese Office Action, dated Oct. 13, 1999, with English language translation of Japanese Examiner's comments.
Japanese Office Action dated Aug. 4, 1999, with English language translation of Japanese Examiner's comments.
Neal S. Bergano, et al. "40 Gb/s WDM Transmission of Eight 5 Gb/s Data Channels Over Transoceanic Distances Using the Conventional NRZ Modulation Format", OFC'95 Post Dead Line, PD19–1 to PD19–5, Feb. 24, 1995.

\* cited by examiner

*Primary Examiner*—Leslie Pascal
*Assistant Examiner*—Dalzid Singh
(74) *Attorney, Agent, or Firm*—McGuireWoods LLP

(57) ABSTRACT

An optical wavelength multiplex transmission system including repeaters is disclosed, in which a deviation ($\Delta(S/N)$) of S/N ratios of optical wavelength components of a multiplex optical signal at an optical receiver unit becomes zero. In this system, the optical receiver unit is provided with an optical S/N ratio equalizing filter having such a loss characteristics that the optical S/N ratios of respective optical wavelength components of an optical receiving signal at the optical receiver unit becomes substantially same.

13 Claims, 5 Drawing Sheets

OPTICAL WAVELENGTH MULTIPLEX TRANSMISSION SYSTEM USING REPEATERS

BACKGROUND OF THE INVENTION

The present invention relates to an optical wavelength multiplex transmission system using repeaters and, particularly, to a transmission system in which a plurality of wavelength-multiplexed signal lights are transmitted through an optical transmission line having a plurality of optical amplifying repeaters.

The optical wavelength multiplex transmission system using the repeaters includes basically an optical transmitter unit, an optical receiver unit and an optical transmission line connecting the optical transmitter unit to the optical receiver unit. The optical transmitter unit includes a first to n-th light sources, a first to n-th optical modulators corresponding to the respective first to n-th light sources, a first to n-th optical amplifiers, an optical coupler for multiplexing optical signals from the respective optical amplifiers and a boosting optical amplifier, where n is an integer larger than 1. The optical receiver unit includes a light distributer, a band-pass filter and an optical receiver for receiving the respective signal lights. The optical transmission line includes usually a plurality of optical amplifying repeaters.

In the optical transmission unit, the light sources emit optical signals having different first to n-th wavelengths, respectively. These optical signals are supplied to the respective optical modulators. Modulated optical signals from the optical modulators are amplified by the optical amplifiers, respectively, wavelength-multiplexed by the optical coupler and supplied to the boosting optical amplifier. The boosting optical amplifier amplifies the wavelength-multiplexed optical signal and a resultant optical wavelength multiplex signal is transmitted from the optical transmitter unit as an optical transmitting signal, relayed by the plurality of the optical amplifying repeaters of the optical transmission line and supplied to the optical receiver unit.

The optical receiver unit receives the optical transmitting signal as an optical receiving signal, the optical distributor branches the optical receiving signal to a first to n-th optical signals. The branched optical signals are supplied to the optical band-pass filters, respectively. Each of the optical band-pass filters allows only one of the optical signals which has a predetermined wavelength assigned thereto to pass through. The optical signals passed through the band-pass filters are supplied to the first to n-th optical receivers, respectively.

In the optical wavelength multiplex transmission system which uses the repeaters and has the construction as mentioned above, optical S/N ratios of the transmitting optical signal depend upon signal levels of optical wavelength components of the optical signal after transmission and optical noise, that is, amplified spontaneous emission (referred to as "ASE", hereinafter) generated in the optical amplifying repeaters in the transmission line. However, because of the gain-wavelength characteristics of the optical amplifying repeater, the larger the attenuation of optical wavelength component of the wavelength multiplexed optical signal is the remoter the wavelength thereof from a center wavelength of the multiplexed optical signal. As a result, there is a large deviation of optical S/N ratio produced between the optical wavelength components of the optical receiving signal after transmission. When there is such large deviation of optical S/N ratio between the respective optical wavelength components, the optical receiver unit can not receive the multiplexed optical transmission signal exactly.

An example of a method for removing such deviation of optical S/N ratio, that is, equalizing the optical S/N ratios, is disclosed in, for example, Neal S. Bergano, et al., "40 Gb/s WDM Transmission of Eight 5 Gb/s Data Channels Over Transoceanic Distances using the Conventional NRZ Modulation Format", OFC'95 Post Dead Line, PD19-1 to PD19-5, Feb. 24, 1995. According to the disclosed method, after an optical transmission line having a plurality of optical repeaters is built, optical spectrum is measured at a receiving end of the optical transmission line. On the basis of a result of the measurement, signal levels of optical wavelength components of the respectively transmitting optical signals are regulated in an optical transmitter unit to equalize optical S/N ratios of the optical wavelength components of the receiving optical signal. This procedures are repeated until the optical S/N ratios of the wavelength components of the receiving optical signal becomes exactly the same.

However, the above mentioned conventional equalizing method has some problems. A first one of the problems is that, after the optical transmission line is built, it is necessary to regulate the levels of the transmitting optical signals in the optical transmitter unit by communicating between the opposite ends of the transmission line, which is very troublesome. A second problem is that, since a regulation range of the optical levels of the respective wavelength components of the optical signal in the optical transmitter unit is known only after the construction of the transmission line, it is necessary to preliminarily prepare a very wide regulation range of optical signal level in the optical transmitter unit.

SUMMARY OF THE INVENTION

Therefore, an object of the present invention is to solve these problems by providing a system capable of easily equalizing optical S/N ratios of respective optical wavelength components of an optical signal received by an optical receiver unit.

According to the present invention, an optical wavelength multiplex transmission system having repeaters comprises an optical transmitter unit for transmitting optical wavelength multiplexed signal, an optical transmission line having a plurality of optical amplifiers, an optical receiver unit for receiving the optical wavelength multiplexed signal and optical S/N ratio equalizing filters. The optical S/N ratio equalizing filter has such loss characteristics as substantially equalizing optical S/N ratios of the respective optical wavelength components of the optical signal received by the optical receiver unit.

In another aspect of the present invention, an optical wavelength multiplex transmission system having repeaters comprises an optical transmitter unit for transmitting optical wavelength multiplexed signal, an optical transmission line having a plurality of optical amplifiers and an optical receiver unit for receiving the optical wavelength multiplexed signal, wherein output power levels of a plurality of light sources of the optical transmitter unit are made deviated such that the optical S/N ratios of the respective optical wavelength components of the optical signal received by the optical receiver unit are substantially equal to each other.

The optical transmitter unit comprises light sources corresponding in number to optical signal wavelength components to be multiplexed, optical modulators corresponding in number to the optical signal wavelength components, an optical coupler for multiplexing the optical signal wavelength components and an optical S/N ratio equalizing filter supplied with the multiplexed signal lights. The optical S/N ratio equalizing filter has such a loss characteristics as substantially equalizing the optical S/N ratios of the respective optical wavelength components of the optical signal received by the optical receiver unit.

Alternatively, the optical transmitter unit comprises light sources corresponding in number to optical wavelength components to be multiplexed, optical modulators corresponding in number to the wavelength components of the optical and an optical coupler or multiplexer for multiplexing the optical wavelength components, wherein the optical wavelength components of the transmitting optical signal transmitted by the optical transmitter unit have such output power levels as substantially equalizing the optical S/N ratios of the respective optical wavelength components of the receiving optical signal received by the optical receiver unit.

The loss characteristics of the optical S/N ratio equalizing filter is an inverse characteristics to a gain-deviation characteristics of the optical transmission line having a plurality of optical amplifiers and has optical output level deviation of −40%~−60% of that of the gain-deviation characteristics of the optical transmission line for the optical wavelength multiplexed signal, and output power levels of the plurality of the light sources of the optical transmitter unit have an inverse optical output level deviation of −40%~−60% of that of the gain-deviation characteristics of the optical transmission line for the optical wavelength multiplexed signal.

With using such system, method and optical transmitter unit, it is possible to easily equalize the optical S/N ratios of the respective optical wavelength components of the receiving optical signal received by the optical receiver unit.

BRIEF DESCRIPTION OF THE DRAWINGS

The above and other objects, features and advantages of the present invention will become more apparent from the following detailed description when taken with the accompanying drawings in which.

DETAILED DESCRIPTION OF THE PREFERRED EMBODIMENTS

Figure 1:
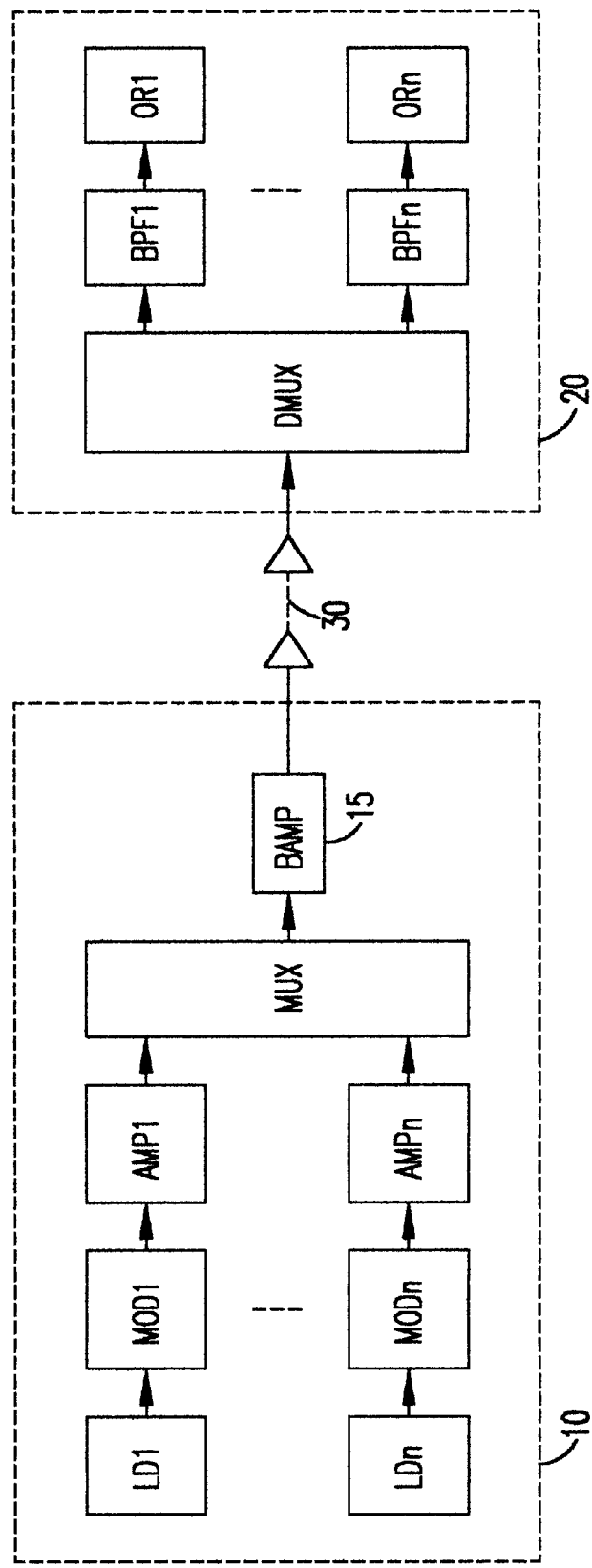
FIG. 1 is a block diagram of an example of a conventional optical wavelength multiplexed transmission system having repeaters.

First, an example of a conventional optical wavelength multiplex transmission system using repeaters will be described briefly with reference to the drawings. Referring to FIG. 1, an optical transmitter unit 10 includes laser diodes LD1 to LDn corresponding in number to wavelength components of an optical signal which are to be multiplexed, modulators MOD1 to MODn connected to outputs of the respective laser diodes, and optical amplifiers AMP1 to AMPn connected to outputs of the respective optical modulators. The optical transmitter unit 10 further includes an optical coupler or multiplexer MUX for multiplexing the signal lights having the respective wavelength components and a boosting optical amplifier BAMP 15 which amplifies and transmits the optical signal having wavelength components multiplexed by the optical coupler or multiplexer MUX. The optical signal having the wavelength components multiplexed is passed through an optical transmission line 30 provided with a plurality of optical amplifying repeaters and branched by a light distributor or demultiplexer DMUX of the optical receiver unit 20. The branched optical signal components are passed through band-pass filters BP1 to BPn and received by optical receivers OR1 to ORn, respectively.

Figure 2A:
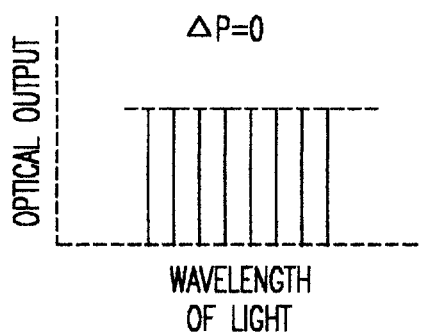
FIGS. 2(A) to 2(F) illustrate a conventional method of equalizing a deviation of optical S/N ratios.
Figure 2D:
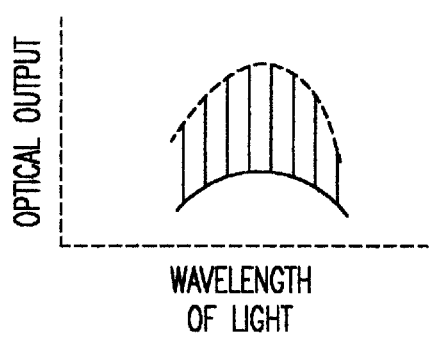
Figure 2B:
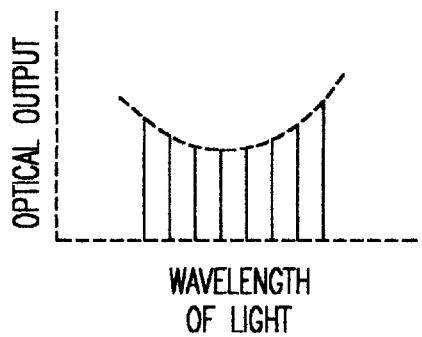
Figure 2E:
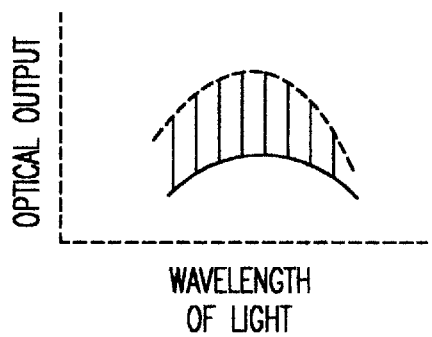
Figure 2C:
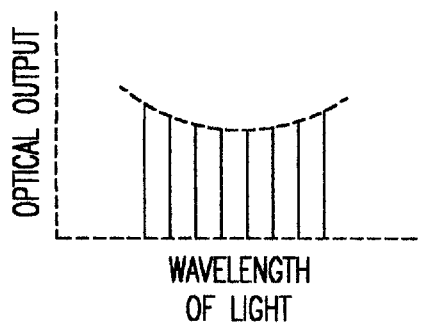
Figure 2F:
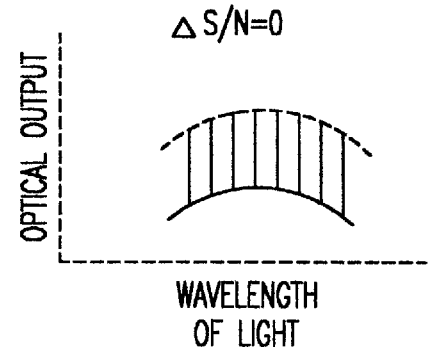

FIGS. 2A to 2F show a method of equalizing deviation of optical S/N ratios in the optical receiver unit 20, in which FIGS. 2A, 2B and 2C show a relation between optical signal level and wavelength in the optical transmitter unit 10 and FIGS. 2D, 2E and 2F show a relation between optical signal level and wavelength in the optical receiver unit 20. As shown in FIG. 2A, the optical signal having respective wavelength components are transmitted with the same output power levels by the optical transmitter unit 10 as an optical transmitting signal and S/N ratios of the respective wavelength components are measured by the optical receiver unit 20 as shown in FIG. 2D. Then, in the optical transmitter unit 10, the output power levels of the respective wavelength components of the optical transmitting signal are changed as shown in FIG. 2B on the basis of the measured optical output power-optical wavelength relation shown in FIG. 2D and the optical transmitting signal having the optical wavelength components whose output power levels are changed are transmitted again as shown in FIG. 2B. Similarly, the output power levels of the wavelength components are changed again as shown in FIG. 2C according to the measured relation shown in FIG. 2E and, finally, the output power levels of the wavelength components are regulated in the optical receiver unit 20 such that the deviation of S/N ratios thereof becomes zero (ΔS/N=0) as shown in FIG. 2F. According to this method, however, the optical signal levels must be regulated repeatedly in the optical transmitter unit 10 through troublesome procedures.

Figure 3:
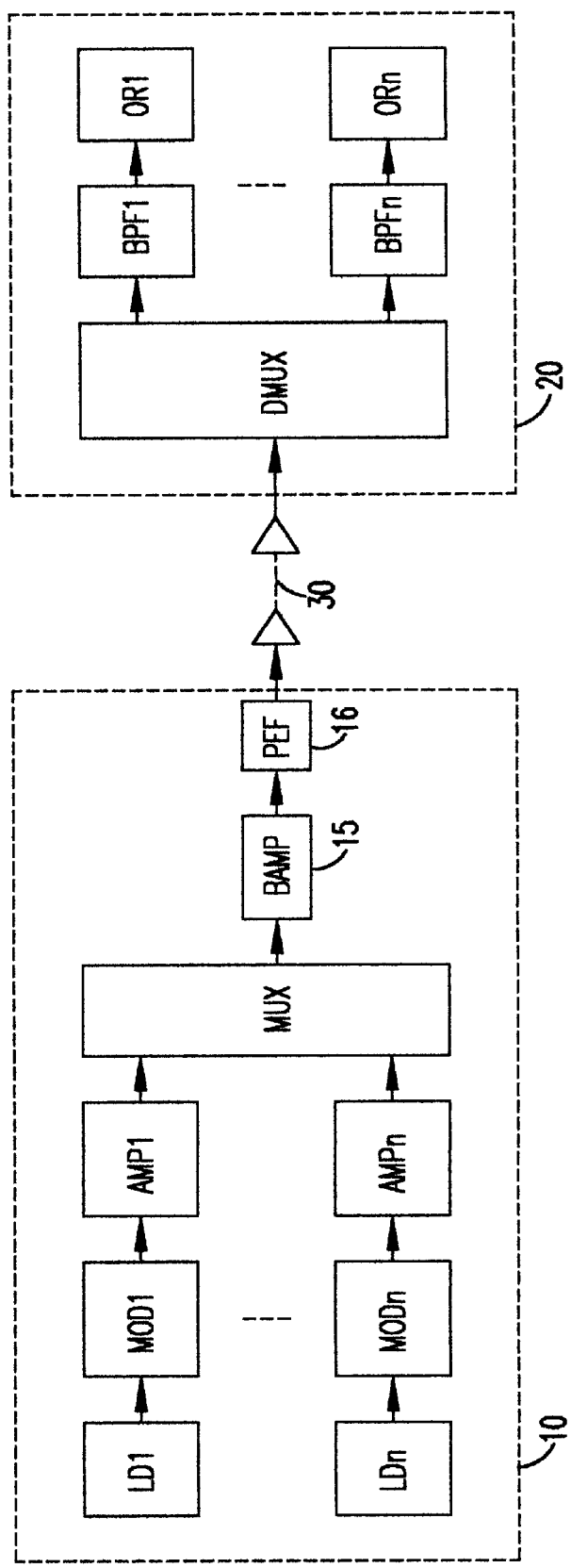
FIG. 3 is a block diagram showing an embodiment of an optical wavelength multiplexed transmission system having repeaters, according to the present invention.

Now, an embodiment of the optical wavelength multiplex transmission system using repeaters according to the present invention will be described with reference to FIG. 3. The system shown in FIG. 3 differs from the conventional system shown in FIG. 1 in that an optical transmitter unit 10 includes, in addition to light sources LD1 to LDn, modulators MOD1 to MDn, amplifiers AMP1 to AMPn, an optical. coupler or multiplexer MUX and a boosting amplifier BAMP 15 which are the same as those of the conventional optical transmitter unit 10, an optical S/N ratio equalizing filter PEF 16 connected to an output terminal of the boosting optical amplifier BAMP 15. The optical S/N ratio equalizing filter PEF 16 functions to filter the amplified optical multiplexed signal output from the boosting optical amplifier BAMP 15 as to be described later.

Figure 4A:
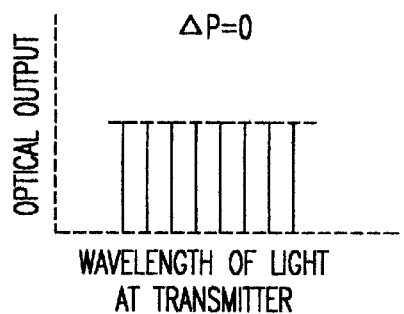
FIGS. 4A to 4F show a method of equalizing a deviation of optical S/N ratios, according to the present invention.
Figure 4D:
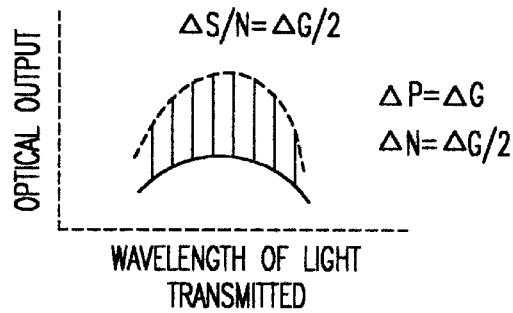
Figure 4B:
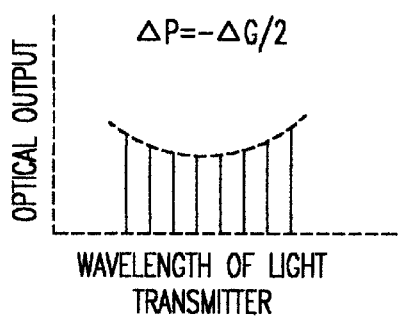
Figure 4E:
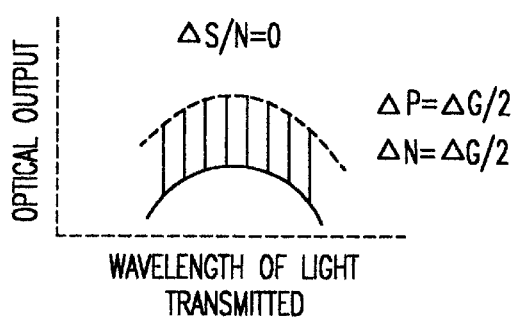
Figure 4C:
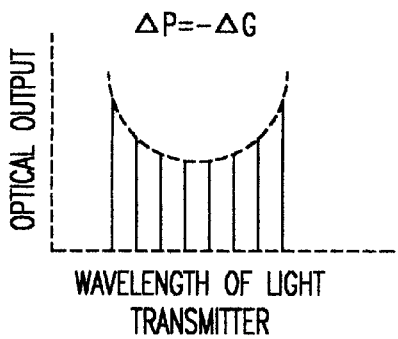
Figure 4F:
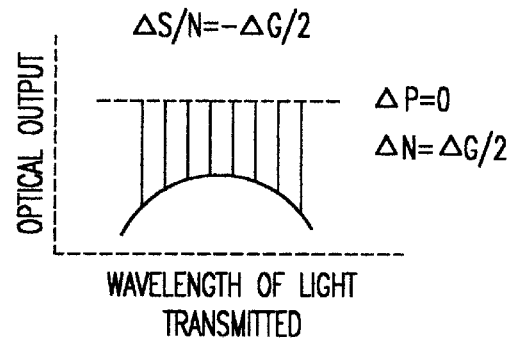

In the present invention, the optical S/N equalizing filter PEF 16 has such a characteristics that the level deviation (logarithmic expression) of the respective optical wavelength components of the transmitting optical signal transmitted from the optical transmitter unit 10 is set to −40%~−60% of the gain deviation (logarithmic expression) of the transmission line 30. That is, the higher the output power level of the optical wavelength component of the transmitting optical signal from the optical transmitter unit 10 is the larger the difference of the wavelength thereof from a center wavelength of the transmitted optical signal. On the basis of this characteristics of the optical S/N ratio equalizing filter PEF 16, the deviation of the optical S/N ratios of the respective optical wavelength components of the optical transmitting signal transmitted through an optical transmission line 30 is equalized, so that the optical S/N ratios of the respective optical wavelength components of the optical receiving signal at an output terminal of the optical transmission line 30, that is, the optical receiving signal received by an optical receiver unit 20, become equal. The principle on which this effect is obtained will be described with reference to FIGS. 4A to 4F, in which FIGS. 4A, 4B and 4C show optical output power levels of the respective wavelength components of the optical transmitting signals at the optical transmitter unit 10 and FIGS. 4D, 4E and 4F show power levels of the wavelength components of the optical receiving signals at the optical receiver unit 20. FIGS. 4A and 4D show relations between optical signal level and wavelength of the optical transmitting signal in the optical transmitter unit 10 and that of the optical receiving signal in the receiver unit 20, respectively, in a case where the output power levels (logarithmic expression) of the respective optical wavelength components of the transmitting signal at the optical transmitter unit 10 are set equal to each other, FIGS. 4B and 4E D show relations between optical signal level and wavelength of the optical transmitting signal at the optical transmitter unit 10 and that of the optical receiving signal at the receiver unit 20, respectively, in a case where the output power levels (logarithmic expression) of the respective optical wavelength components of the transmitting signal at the optical transmitter unit 10 are set to a half of the gain deviation (logarithmic expression) of the optical transmission line 30 and FIGS. 4C and 4F show relations between output power level and wavelength of the optical transmitting signal at the optical transmitter unit 10 and that of the optical receiving signal at the receiver unit 20, respectively, in a case where the output power levels (logarithmic expression) of the respective optical wavelength components of the transmitting signal at the optical transmitter unit 10 are set equal to the gain deviation (logarithmic expression) of the optical transmission line 30.

Assuming that the gain deviation of each of a plurality (m) optical amplifying repeaters of the optical transmission line is $\Delta g$ [dB], the gain deviation $\Delta G$ of the optical transmission line having the m optical amplifying repeaters becomes $\Delta G=(\Delta g)^m$ [dB]. In the case shown in FIGS. 4A and 4D, the level deviation $\Delta P$ (logarithmic expression) of the optical signal after transmission becomes $\Delta P=\Delta G$ [dB]. Since optical noise (ASE) is generated in each of the respective optical amplifying repeaters and transmitted through a plurality of repeaters in the optical transmission line 30, the level deviation $\Delta N$ (logarithmic expression) becomes $\Delta N=\Delta G/2$ [dB]. Therefore, the deviation $\Delta(S/N)$(logarithmic expression) of the S/N ratios of the respective optical wavelength components after transmission becomes $\Delta(S/N)=\Delta G/2$ [dB].

In the case shown in FIGS. 4C and 4F, when the deviation of the optical signal level in the optical transmitter unit 10 is set as $\Delta P=-\Delta G$ [dB], the levels of the respective wavelength components of the optical receiving signal at the output terminal of the optical transmission line 30 become equal to each other. Since the level deviation of the optical noise (ASE) is $\Delta N=\Delta G/2$ [dB], the worse the optical S/N ratio of optical wavelength component is the closer the wavelength to the center wavelength contrary to the case shown in FIGS. 4A and 4D and, therefore, the deviation (logarithmic expression) of optical S/N ratio becomes $\Delta(S/N)=-\Delta G/2$ [dB].

In the case shown in FIGS. 4B and 4E, when the deviation of the optical signal level at the optical transmitter unit 10 is set to $\Delta P=-\Delta G/2$ [dB], the larger the optical level of the wavelength component is the remoter from the center wavelength, compared with that closer to the center wavelength. Since the deviation (logarithmic expression) of signal levels of the respective wavelength components of the optical receiving signal after transmission becomes $\Delta P=\Delta G/2$ [dB] and the deviation (logarithmic expression) of the optical noise level is $\Delta N=\Delta G/2$ [dB], the deviation (logarithmic expression) of optical S/N ratio becomes $\Delta(S/N)=0$ [dB]. As such, the level deviation (logarithmic expression) of the respective optical wavelength components of the optical transmitting signal at the optical transmitter unit 10 is set to −50% substantially inverse to the gain deviation (logarithmic expression) of the transmission line 30. Although it is preferable to set it to −50% exactly, a range from −40% to −60% may be used practically.

Incidentally, the several equations used in this description have been derived by the present inventors prior to the priority date of this application as mentioned below.

To obtain the $\Delta SNR$ between WDM channels, it is assumed that (1) all EDFA's have the same gain characteristics, (2) the same noise figure with no wavelength dependency, and (3) all span fibers have the same loss, and it is defined that (4) the $g_0$ is the gain of reference channel at each EDFA which equal to the loss of each span fiber, and (5) the $\Delta SNR_k$ is the ratio of the $SNR_k$ for k-th channel to the $SNR_0$ for reference channel after transmission. Under these assumptions and definition, the $\Delta SNR_k$ of the k-th channel is given by the following equations (1), (2) and (3).

$$\Delta SNR_k = \frac{\Delta P_k \cdot \Delta G_k}{\left(\sum_{i=1}^{N}(\Delta g_k)^i\right)/N} = \frac{\Delta S}{\Delta N}$$

with $$\Delta P_k = \frac{P_k}{P_{g0}}$$

$$\Delta G_k = (\Delta g_k)^N = \left(\frac{g_k}{g_0}\right)^N$$

where subscript k is k-th channel, N is the number of EDFA's, $P_{g0}$ is the output power of reference channel at transmitter, $P_k$ is the output power of k-th channel at transmitter, $g_k$ is the gain of k-th channel to reference channel at each EDFA, $\Delta P_k$ which means channel pre-emphasis factor is the relative output power of k-th channel to reference channel at transmitter. $\Delta G_k$ is the relative gain of k-th channel after transmission. The equation (1) shows that the $\Delta SNR_k$ can be calculated by relative value $\Delta P_k$, $\Delta g_k$ and N. Next, the equation for the channel Pre-emphasis factor $\Delta P_k$ from the equation (1) is derived. At the condition of $\Delta SNR_k=1$, which means the $SNR_k$ equal to the $SNR_0$, the channel pre-emphasis factor $\Delta P_k$ is obtained by the following equation (4).

$$\Delta P_k = \frac{\left(\sum_{i=1}^{N}(\Delta g_k)^i\right)/N}{\Delta G_k}$$

Under the conditions of N>10 and ΔG<5 dB, $\Delta P_k$ can be roughly estimated by the following simple equation (5).

$$\Delta P_k \approx (\Delta G_k)^{-0.5}$$

where $\Delta G_k$<5 dB.

By using equation (5), the channel pre-emphasis factor $\Delta P_k$ can be calculated by only relative gain $\Delta G_k$ of each channel. The output power of each channel at transmitter is adjusted by $\Delta P_k$, then the $\Delta SNR_k$ after transmission is equalized and the SNR of all channels become to same value.

Figure 5A:
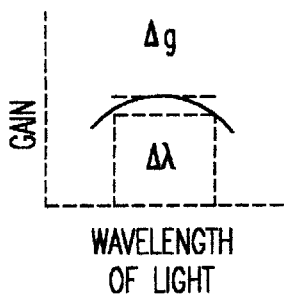
FIG. 5A is a graph showing a gain-wavelength characteristics of an optical amplifying repeater.
Figure 5B:
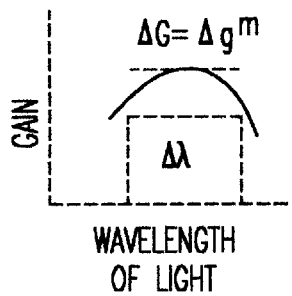
FIG. 5B is a graph showing a gain-wavelength characteristics of an optical transmission line.
Figure 5C:
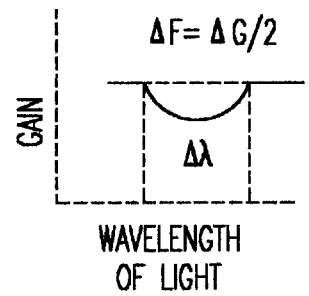
FIG. 5C is a graph showing a loss characteristics of an optical S/N ratio equalizing filter.

FIG. 5A is a graph of the gain-wavelength characteristics of the optical amplifying repeater, showing that its gain deviation ΔG is Δg [dB] in a wavelength range Δλ. The gain-wavelength characteristics of the optical transmission line 30 shown in FIG. 5B depends upon the number m of the optical amplifying repeaters in the optical transmission line and the gain deviation ΔG in the wavelength range Δλ is $(\Delta g)^m$. The loss-wavelength characteristics ΔF [dB] of the optical S/N ratio equalizing filter 16 is made equal to ΔG/2 [dB] in the wavelength range Δλ.

Figure 6A:
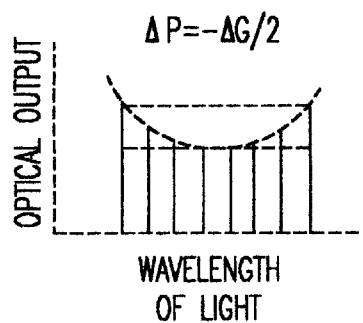
FIG. 6A shows an optical spectrum of an optical signal transmitted.
Figure 6B:
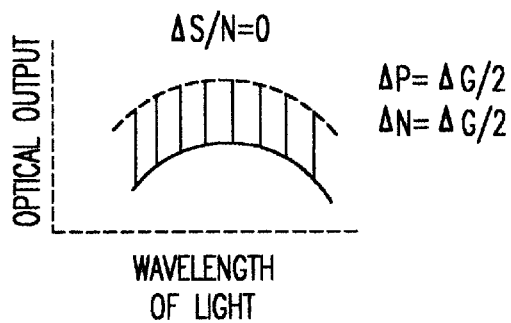
FIG. 6B shows an optical spectrum of an optical signal received.

FIG. 6A shows the optical spectrum of the optical transmitting signal at the optical transmitter unit 10. The output power levels of the respective optical signals multiplexed at the optical coupler are equal at an output portion of the optical amplifier 15. After it passes through the optical S/N ratio equalizing filter 16, the output power levels of the respective signals (optical wavelength components) are output with level deviation ΔP (ΔP=−ΔG/2) [dB], as shown in FIG. 6B.

The optical signal transmitted through the optical transmission line 30 is incident on the optical receiver unit 20 with the output power level of the wavelength component remoter from the center wavelength of the optical signal being more attenuated. The optical noise (ASE) generated at the optical amplifying repeaters in the optical transmission line 30 is accumulated gradually while passing through the repeaters, so that the deviation Δ(S/N) of the optical S/N ratios of the respective optical wavelength components of the optical receiving signal at the optical receiver unit 20 becomes zero and the optical S/N ratios of the respective optical wavelength components becomes same.

A concrete example of the optical wavelength multiplex transmission system using optical repeaters under conditions the transmission distance of the optical transmission line 30 being 3,200 km and the number m of the optical amplifying repeaters being 40 with a distance between adjacent repeaters being 80 km will be considered when the optical signal containing 8 wavelength components (n=8) with a distance between adjacent wavelength spectra of 1.6 nm and a wavelength range Δλ of 11.2 nmm is input. Further, it is assumed in this case that the gain deviation Δg of each optical amplifying repeater is 0.2 dB. In this example, the gain deviation ΔG of the optical transmission line 30 becomes 8.0 dB. Assuming that the loss characteristics of the optical S/N ratio equalizing filter is ΔF=4.0 dB (=ΔG/2), the level deviation of the wavelength components of the optical transmitting signal from the optical transmitter unit 10 becomes ΔP=−4.0 dB (=−ΔG/2) and the level deviation of the wavelength components of the optical transmitting signal from the optical transmitter unit 10 becomes ΔP=4.0 dB (=ΔG/2). On the other hand, the level deviation of the optical noise generated at the optical amplifying repeaters and accumulated while passing through the repeaters becomes ΔN=4.0 dB (=ΔG/2). Under the above mentioned conditions, the deviation of optical S/N ratio of the optical wavelength components of the optical receiving signal after transmission becomes substantially zero.

As mentioned above, in the present invention, it may be possible to use, in lieu of the optical S/N ratio equalizing filter, means for providing the optical level deviation by setting output power levels of a plurality of light sources in the optical transmitter units.

The optical S/N ratio equalizing filter can be realized by using the known etaron filter or fiber grating filter.

As described hereinbefore, according to the present invention, it is possible to easily set the optical S/N ratios of the respective wavelength components of the optical receiving signal at the optical receiver unit.

While the present invention has been described in connection with certain preferred embodiments, it is to be understood that the subject matter encompassed by the present invention is not limited to those specific embodiments. On the contrary, it is intended to include all alternatives, modifications and equivalents as can be included within the spirit and scope of the following claims.

What is claimed is:

1. An optical wavelength multiplex transmission system using repeaters, comprising:

an optical transmitter unit for transmitting an optical wavelength multiplex signal;

an optical transmission line including a plurality of optical amplifiers; an optical receiver unit for receiving the optical wavelength multiplex signal; and an optical S/N ratio equalizing filter having such a loss characteristics that optical S/N ratios of optical wavelength components of an optical receiving signal at said optical receiver unit are made substantially same, wherein said optical S/N ratio equalizing filter has a loss characteristics having the deviation of optical output power level of −40% to −60% of the gain-deviation characteristics of said optical transmission line including the plurality of said optical amplifiers, for the optical wavelength multiplex signal.

2. An optical wavelength multiplex transmission system as claimed in claim 1, wherein said optical S/N ratio equalizing filter is provided in said optical transmitter unit.

3. An optical wavelength multiplex transmission system as claimed in claim 1, wherein said optical S/N ratio equalizing filter is an etaron filter.

4. An optical wavelength multiplex transmission system as claimed in claim 1, wherein said optical S/N ratio equalizing filter is a fiber grating filter.

5. An optical communication system having a transmitter, an optical transmission line including a plurality of optical repeaters and a receiver, said transmitter comprising:

a first light source for outputting first light having a first wavelength;

a second light source for outputting second light having a second wavelength which is different from the first wavelength;

a multiplex unit coupled to said first and second light sources, for multiplexing the first and second lights to output an optical wavelength multiplex signal; and an equalizing filter coupled to said multiplex unit, for filtering the optical wavelength multiplex signal from said multiplex unit and transmitting a filtered multiplex signal to the receiver through the optical transmission line to equalize deviation between optical S/N ratios of the first and second wavelength of the filtered multiplex signal which is received by the receiver, wherein said equalizing filter has a loss characteristics having the deviation of optical output power level of −40% to −60% of the gain-deviation characteristics of said optical transmission line including the plurality of said optical amplifiers, for the optical wavelength multiplex signal from said multiplex unit.

6. An optical communication system as claimed in claim 5, wherein said receiver comprises:

a light distributer for distributing the filtered multiplex signal into a plurality of optical signal;

a plurality of band-pass filters for filtering the plurality of optical signal, respectively; and a plurality of optical receivers corresponding to said plurality of band-pass filter, for receiving the plurality of optical signal which have been filtered.

7. An optical communication system as claimed in claim 5, wherein said plurality of optical repeaters are arranged such that a distance between said optical repeaters is substantially 80 km.

8. An optical communication system as claimed in claim 5, wherein said deviation becomes substantially zero by said equalizing filter filtering the optical wavelength multiplex signal from said multiplex unit.

9. An optical communication system as claimed in claim 5, wherein each of said optical repeaters has an erbuim doped fiber amplifier (EDFA).

10. An optical communication system as claimed in claim 5, wherein said equalizing filter is an etaron filter.

11. An optical communication system as claimed in claim 5, wherein said equalizing filter is a fiber grating filter.

12. An optical communication system as claimed in claim 5, wherein said equalizing filter has a loss characteristics having the deviation of optical output power level of −40% to −60% of the gain-deviation characteristics of said optical transmission line including the plurality of said optical amplifiers, for the optical wavelength multiplex signal from said multiplex unit.

13. An optical communication system as claimed in claim 5, wherein said transmitter further comprises:

a first modulator coupled to said first light source, for modulating the first light from said first light source to output a modulated first optical signal; and a second modulator coupled to said second light source, for modulating the second light from said second light source to output a modulated second optical signal, and wherein said multiplex unit multiplexes the first modulated optical signal and the second modulated optical signal to output the optical wavelength multiplex signal.

* * * * *